United States Patent [19]

Knappe et al.

[11] 4,356,146

[45] Oct. 26, 1982

[54] INCOMING AND OUTGOING AIR CONVEYANCE FOR DRY STORAGE WITH SELF HEATING RADIOACTIVE MATERIALS

[76] Inventors: Ortwin Knappe, Grunaustrasse 19, 6450 Hanau 9; Walter Hame, Johannes-Brahms-Strasse 16, 7520 Bruchsal, both of Fed. Rep. of Germany

[21] Appl. No.: 137,293

[22] Filed: Apr. 3, 1980

[30] Foreign Application Priority Data

Apr. 4, 1979 [DE] Fed. Rep. of Germany ....... 2913540

[51] Int. Cl.³ .............................................. G21C 15/26
[52] U.S. Cl. .................................................. 376/272
[58] Field of Search ................... 98/31, 32, 35, 37, 49, 98/51, 52, 53, 54, 62, 65; 52/169.5; 422/903; 376/272, 391; 252/633; 250/506

[56] References Cited

U.S. PATENT DOCUMENTS

| 187,433 | 2/1877 | Unkrich | 98/62 |
|---|---|---|---|
| 1,689,246 | 10/1928 | Knapen | 98/32 |
| 2,729,966 | 1/1956 | Lutteke | 52/169.5 X |
| 3,121,384 | 2/1964 | Brode | 98/37 X |
| 3,394,645 | 7/1968 | Acker | 98/32 |
| 3,587,908 | 6/1971 | Nickel | 98/37 X |

FOREIGN PATENT DOCUMENTS

| 62736 | 9/1891 | Fed. Rep. of Germany | 98/53 |
|---|---|---|---|
| 647383 | 7/1937 | Fed. Rep. of Germany | 98/32 |
| 767907 | 7/1934 | France | 98/32 |

OTHER PUBLICATIONS

"Storage of Radioactive Wastes", *Radioactive Waste Disposal Low and High Level*, Noyes Data Corporation, Park Ridge, New Jersey, ©1977, pp. 167–173.

*Primary Examiner*—Albert J. Makay
*Assistant Examiner*—Harold Joyce
*Attorney, Agent, or Firm*—Cushman, Darby & Cushman

[57] ABSTRACT

There is described an incoming and outgoing air conveyance system for dry storage with self heating radioactive materials in which the incoming air openings and shafts and the outgoing air openings and shafts guarantee a favorable flow of the cooling air and guarantee an undisturbed cooling even with external disturbances. This is obtained by:

(a) arranging the incoming openings in each case both above and laterally on one or more incoming air shafts and providing them with deflection projections or deflection edges, placing deflection plates between the incoming air openings lying above and the lateral incoming air openings and furnishing the lateral incoming air openings with wall projections, (b) leading the incoming and outgoing air shafts without substantial curvature up to the stored material and (c) providing the outgoing air openings carried upwardly with chimney tops having drop edges and deflection plates and wherein there are arranged protective sills between the outgoing air shafts and deflection plates.

17 Claims, 2 Drawing Figures

INCOMING AND OUTGOING AIR CONVEYANCE FOR DRY STORAGE WITH SELF HEATING RADIOACTIVE MATERIALS

BACKGROUND OF THE INVENTION

The invention is directed to incoming and outgoing air conveyance for dry storage with self heating radioactive materials, especially waste. It consists essentially of incoming air openings and shafts and outgoing air openings and shafts.

Self-heating radioactive waste, as e.g. burned up fuel elements from pressure and boiling water reactors, at present are preferably stored under water in order to allow the activity of the fission and activation products to decay. The water hereby fulfulls simultaneously the functions of the shielding of the radioactive irradiation and the cooling of the hot fuel elements or the waste containers.

This storage of radioactive wastes in water tanks has a number of disadvantages which above all are in the large consumption of cooling water and the related loading of the environment.

Therefore there have also been known proposals to insert radioactive waste in so-called dry storage in which a gas, preferably air, is used as cooling medium that carried off the heat from the stored material by forced cooling with e.g. fans, via heat exchangers or directly to the surroundings. However, there is the disadvantage thereby that in accidents, i.e. breakdown of the cooling system or the cooling aggregate there is no longer guaranteed sufficient withdrawal of heat which can lead to inadmissible increases in temperature and to the setting free of toxic radioactive materials.

For these reasons dry storage was developed in which the heat is lead off to the surroundings through convection. (German OS No. 2711405 and related Pirk U.S. application No. 884,818 filed Mar. 9, 1979 and German OS No. 2730729 and related Klein U.S. application No. 922,352 filed July 6, 1978.)

These systems are inherently safe since, because of the natural convection, they do not require any active components or operating aggregate to maintain the cooling operation. The cooling air hereby is brought up via supply openings and shafts onto the stored material to be cooled, warmed there and given up to the surroundings via separate removal shafts and openings. The increased temperature of the normally stationary stored materials in concrete chambers causes the outer air to be steadily sucked in and again to be drawn off.

Permanent machine parts, as e.g. air convectors, are required with the forced cooling in order to transport the necessary cooling air. The design of the incoming and outgoing air openings or the incoming and outgoing air shafts therefore is subject merely to the requirements of the object of protection, i.e., the protection against external influences such as sabotage, airplane collisions or fires while the flow conduit only has a subordinate significance.

On the contrary with natural convection cooling the natural convection must be guaranteed to be as close to maximal as possible, which is influenced substantially by the pressure losses of the ventilating system. Therefore with the incoming and outgoing air openings or incoming and outgoing air shafts besides their necessary object of protection there must also be guaranteed favorable flow conduits.

Therefore there are placed particular criteria of design on the incoming and outgoing air conveyance system. Besides the optimal cooling effect and the least possible influence of weather on the cooling there must be guaranteed the permanent cooling and the protection of the rays present in the dry storehouse in the case of an external accident, as e.g. an airplane collision on the storage place, a surface fire in front of the storage place or pressure waves of an explosion.

In placing the incoming and outgoing air openings on an outer wall of the storage place there can occur poor cooling conditions in the case of unfavorable wind directions. There are particularly critical cooling conditions in the event of a surface fire in front of the building, since the hot gases can be sucked inside the storehouse. With air returns within the air shafts as are indicated in German OS No. 2711405 (and related Pirk U.S. application No. 884,818) and German OS No. 2730729 (and related Klein U.S. application No. 922,352), there occur large flow losses which lead to increased operating temperatures in the storehouse. Through this there is an increased risk of injury to the stored materials. Besides there are needed relatively large building structures.

Therefore it was the problem of the present invention to develop an incoming and outgoing air conveyance system with dry storage for self heating radioactive materials consisting essentially of incoming air openings and shafts and outgoing air openings and shafts which guaranteed a favorable leading of the flow of the cooling air and an undisturbed cooling of the stored materials in the event of external accidents such as fires or airplane collision.

SUMMARY OF THE INVENTION

This problem was solved by the invention by (a) arranging the incoming openings in each case both above and laterally on one or more incoming air shafts and providing them with deflection projections or deflection edges, placing deflection plates between the incoming air openings lying above and the lateral incoming air openings and furnishing the lateral incoming air openings with wall projections, (b) leading the incoming and outgoing air shafts without substantial curvature up to the stored material and (c) providing the outgoing air openings carried upwardly with chimney tops having drop edges and deflection plates and wherein there are arranged protective sills between the outgoing air shafts and deflection plates.

BRIEF DESCRIPTION OF THE DRAWINGS

In the drawings like numerals refer to like parts.

The apparatus of the invention can comprise, consist essentially of or consist of the elements set forth.

DESCRIPTION OF THE PREFERRED EMBODIMENTS

Figure 1:
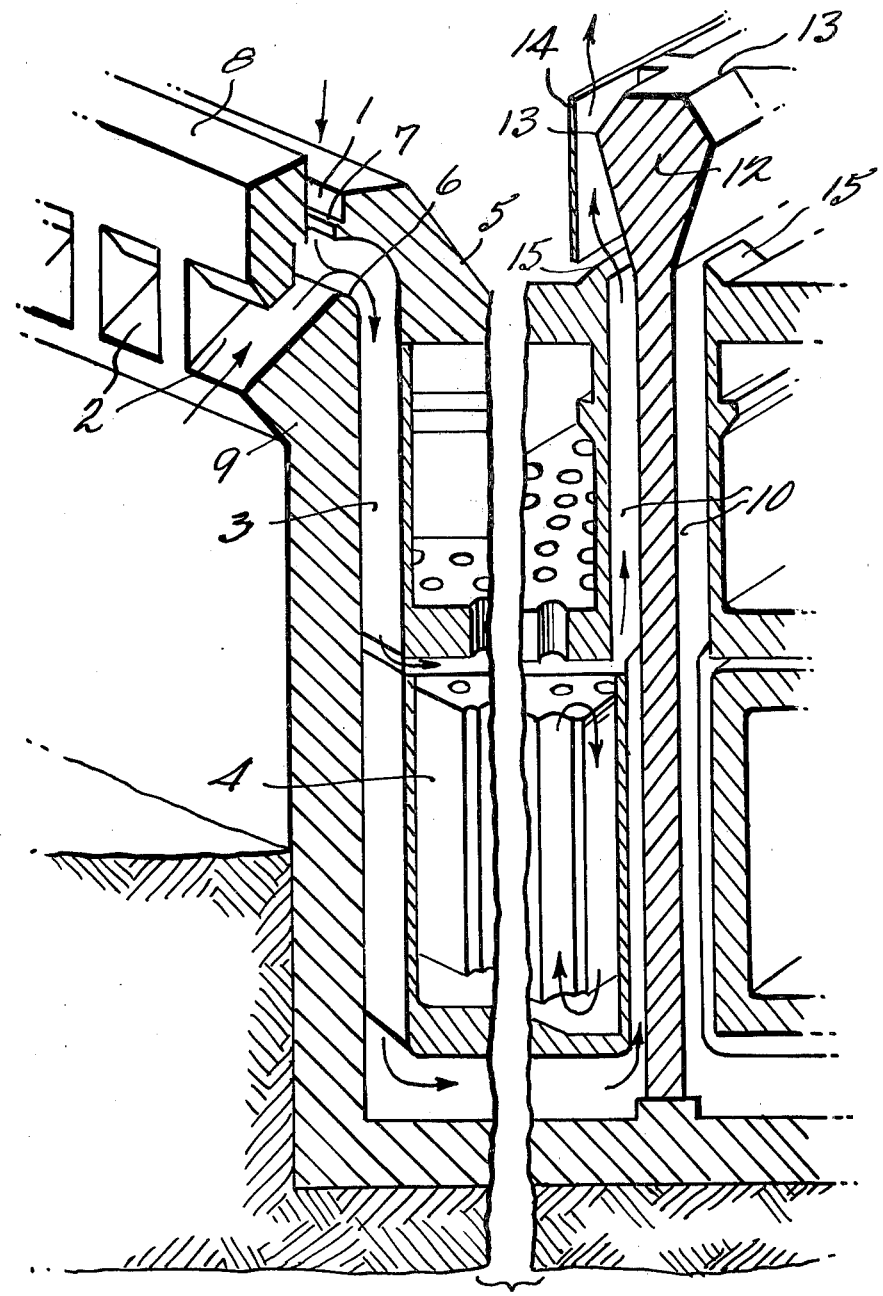
FIG. 1 is a schematic illustration of dry storage using one form of conveyance of incoming and outgoing air according to the invention.

Referring more specifically to FIG. 1 there is represented the conveyance of incoming and outgoing (departing) air in a dry storehouse. The incoming air openings are distributed into incoming air openings 1 arranged above and lateral incoming air openings 2 which discharge generally at an angle of around 60° to 120°, preferably set at about 90°, into the common incoming air shafts 3 in which the incoming air is led to the stored material 4. Because of the required object of protection the incoming air openings 1 and 2 are arranged at an adequate height above the ground level, preferably at the height of the roof construction 5 of the dry storehouse. The cross sections (a) of the incoming air openings (1) lying above, the cross sections (b) of the lateral incoming air openings 2 and the cross sections of the incoming air shafts 3 depend on the required amount of cooling air with which the accumulating heat of the stored material 4 must be led off at a specific temperature level. The cross section ratio (a):(b) is preferably from 1:1 to 1:3.

For the protection against the penetration of solid objects having only small kinetic energy into the incoming air openings 1 and there are advantageously placed screens. The penetration of liquids, as e.g. rain water or kerosene is prevented through the upper incoming air opening 1 in the incoming air shaft 3 by a deflection edge 6 which preferably is rounded off in order to keep the loss of flow low. The splitting effect of a liquid current resulting in the widening of the cross section in this opening 1 is counteracted by a deflection projection 7; besides the widening of the cross section takes place symmetrically with the flow of liquid. The amount of liquid penetrating in the upper openings 2 therefore flows off via the lateral incoming air opening 2, which is preferably inclined at around 10°-65°, to the outside of the structure.

The supply of cooling air is not substantially influenced by changing wind directions. If the wind current causes a dynamic pressure on the lateral openings 2 the upper incoming air opening 1 is in the suction range because of the raised up deflection plate 8 so that there occurs an equalization of pressure between the incoming air openings. This is likewise true for explosion pressure waves which can act from the outside on the dry storehouse. An increase in pressure in the incoming air shaft 3 which could cause a destruction of the stored material 4 in the storage cells is therefore prevented.

On the contrary if the lateral opening 2 is located in the suction range of the wind current there arises a dyamic pressure through the deflection plate 8 before the upper incoming air opening 1 which causes an increased supply of cooling air through the upper incoming air openings. The length of projection of the deflection plate 8 over the incoming air opening 1 depends on the adjacent pitch of the roof as well as on the arrangement of the outgoing air openings and should correspond at least to the cross section (b) of the lateral incoming air openings 2.

The wall projection 9 with a horizontal impingement of solid objects and liquids on the outer wall of the structure insures that no parts from below can be impelled up into the opening; additionally the wall projection 9 deflects the high rising hot gas currents of a surface fire in front of the outer wall from the wall and the lateral incoming air openings 1. Therefore no hot gases penetrate into the incoming air stream since the raised up deflection plate separates the air space above the roof from the rising hot gases and now the upper incoming air opening 1 can provide the incoming air shaft 3 with cooling air. In spite of this if hot gas eddies penetrate into the lateral incoming air opening 2 then these escape again through the upper opening 1 because of the upward force of the hot gases. The incoming shaft 3 involved in this case remains inactive during the fire phase. After the end of the surface fire then the air cooling in this shaft is again established automatically.

After the cooling air has passed the hot stored material 4 and has been heated thereby it rises high in the outgoing air shafts 10 and leaves the structure through the outgoing air openings 11. The outgoing air is led upwardly through the chimney top 12 and discharged as a vertical free jet into the atmosphere. Therefore, the effect of the chimney is not influenced substantially by changing wind directions. Furthermore through this arrangement a penetration of explosion pressure waves into the outgoing air shafts 10 is substantially prevented so that there is eliminated harm to the stored goods 4. This arrangement besides prevents the penetration of solid objects or liquids, as e.g. rain water or kerosene, into the outgoing air shaft 10. This is attained separately with the help of the chimney tops 12 provided with drop edges 13 and the deflection plate 14. Preferably the chimneys are made of reinforced concrete. For this purpose the top 12 with the drop edges 13 projects at least about one half the clear width of the outgoing air shaft 10 over the opening of the outgoing air shaft 10. Between the opening of outgoing air shaft 10 and the deflection plate 14 there are arranged protective sills 15 which form the edge of a channel for liquids possibly penetrating into the outgoing air openings 11.

The preferably trapezoidally shaped reinforced concrete top 12 is tapered advantageously again in the upper region about the drop edge 13 with a pitch of 75°-85°. Therewith there is attained a favorable diffusion action of the cooling air jet passing out vertically upwardly.

The deflection plates 14 preferably consist of metal, especially of steel. Therefore they act thermodynamically as a regulator for the temperature level in the storage cell. Of course in the case of hot summer days the steel plate 14 is additionally heated up externally because of the intensive sun irradiation. Through this the outgoing air in the chimney top region is warmed additionally thus increasing the supply of cooling air. The larger air mass flow then is also needed because of the warmer incoming air temperature in order to be able to keep the storage cell temperature constant. Conversely the steel plates 14 reduce the effective, uplift with a cold atmosphere since it withdraws heat from the outgoing air and further radiates to the surroundings. Through this the cold air mass flow sucked in is reduced so that the storage cell temperature remains at its level and therewith there is avoided injurious dewpoint limits in the dry storehouse. The liquids penetrating into the outgoing air openings 11 are supplied via drop edges 13 and protective sills 15 to a main channel on the roof of the storehouse.

Figure 2:
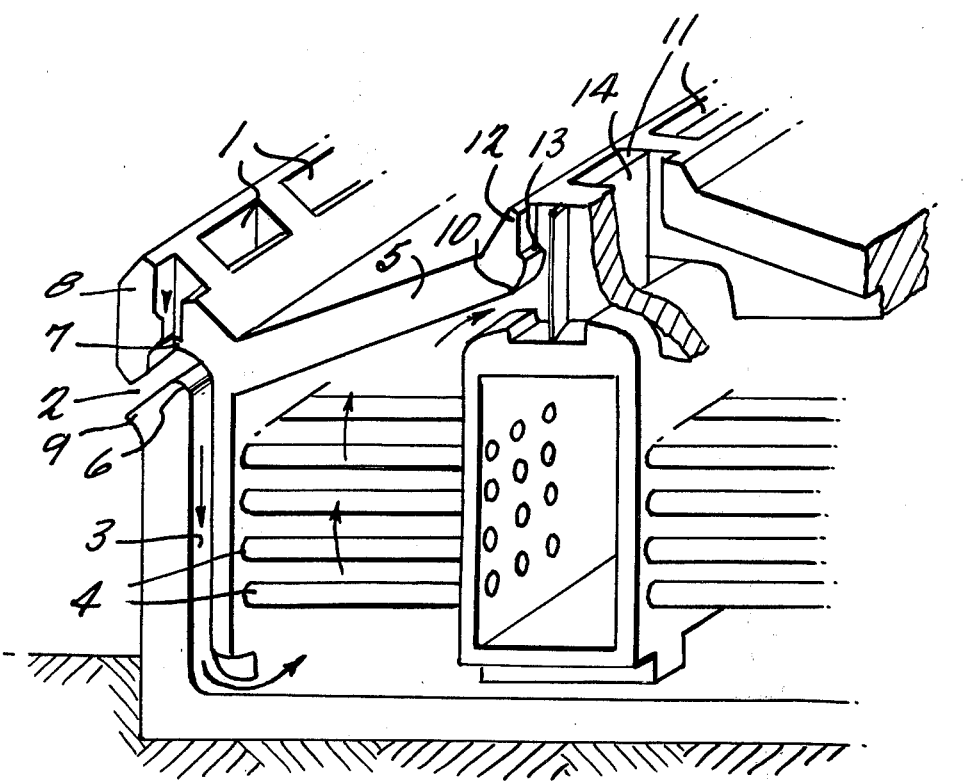
FIG. 2 is a similar schematic illustration of another form of the invention.

In FIG. 2 the roof surface which preferably has a pitch of 10°-25° serves as the flow supplying collection surface for the heated outgoing air. The outgoing air shaft 10 proceeds hereby into the roof surface and opens into the outgoing air openings 11 located in the middle of the roof.

The incoming and outgoing conveyance of air according to the invention is not only advantageous in dry storehouses with natural convection but is also suited for dry storehouse with forced cooling.

What is claimed is:

1. Incoming and outgoing air conveying means for a dry storehouse for self heating radioactive materials, and incoming and outgoing air conveying means comprising:
(a) incoming air openings and shafts and outgoing air openings and shafts wherein the incoming air openings are arranged both above and laterally on at least one incoming air shaft, the incoming air openings being provided with deflection projections or deflection edges, deflection plates situated between the upper incoming air openings and the lateral incoming air openings, said lateral incoming air openings having wall projections thereon;
(b) said incoming and outgoing air shafts being without substantial curvature up to the stored material and
(c) chimney tops having drop edges and deflection plates thereon provided on the upwardly projecting outgoing air openings and protective sills between the outgoing air shafts and said deflection plates.

2. Incoming and outgoing air conveying means according to claim 1 wherein the ratio of the cross section (a) of the upper incoming air openings to the cross-section (b) of the lateral incoming air openings is between 1:1 and 1:3.

3. Incoming and outgoing air conveying means according to claim 2 wherein the upper incoming air openings and the lateral incoming air openings are situated at the height of the roof construction of the dry storehouse and discharge at an angle of about 60°–120° into the air shaft.

4. Incoming and outgoing air conveying means according to claim 3 wherein the incoming air openings are provided with narrow mesh screens.

5. Incoming and outgoing air conveying means according to claim 4 wherein the lateral incoming air openings are connected at an angle α of 10°–65° upwardly to the deflection edges on the incoming air shaft.

6. Incoming and outgoing air conveying means according to claim 5 wherein the deflection plates are made of metal.

7. Incoming and outgoing air conveying means according to claim 6 wherein the chimney tops above the drop edges are tapered at a pitch of 75°–85°.

8. Incoming and outgoing air conveying means according to claim 5 wherein the chimney tops above the drop edges are tapered at a pitch of 75°–85°.

9. Incoming and outgoing air conveying means according to claim 3 wherein the chimney tops above the drop edges are tapered at a pitch of 75°–85°.

10. Incoming and outgoing air conveying means according to claim 2 wherein the chimney tops above the drop edges are tapered at a pitch of 75°–85°.

11. Incoming and outgoing air conveying means according to claim 1 wherein the chimney tops above the drop edges are tapered at a pitch of 75°–85°.

12. Incoming and outgoing air conveying means according to claim 3 wherein the lateral incoming air openings are connected at an angle α of 10°–65° upwardly to the deflection edges on the incoming air shaft.

13. Incoming and outgoing air conveying means according to claim 2 wherein the lateral incoming air openings are connected at an angle α of 10°–65° upwardly to the deflection edges on the incoming air shaft.

14. Incoming and outgoing air conveying means according to claim 1 wherein the lateral incoming air openings are connected at an angle α of 10°–65° upwardly to the deflection edges on the incoming air shaft.

15. Incoming and outgoing air conveying means according to claim 2 wherein the incoming air openings are provided with narrow mesh screens.

16. Incoming and outgoing air conveying means according to claim 1 wherein the incoming air openings are provided with narrow mesh screens.

17. Incoming and outgoing air conveying means according to claim 1 wherein the upper incoming air openings and the lateral incoming air openings are situated at the height of the roof construction of the dry storehouse and discharge at an angle of about 60°–120° into the air shaft.

* * * * *